May 2, 1939. W. KUNER 2,156,730

VEHICLE FRAME

Filed Sept. 7, 1937

Inventor
William Kuner
By F. L. Walker
Attorney

Patented May 2, 1939

2,156,730

UNITED STATES PATENT OFFICE 2,156,730

VEHICLE FRAME

William Kuner, Vandalia, Ohio, assignor of one-half to Everett P. Larsh, Vandalia, Ohio Application September 7, 1937, Serial No. 162,619

8 Claims. (Cl. 293—55)

This invention pertains to a safety frame or chassis for automobiles, railway cars and other vehicles which are likely to be involved in head-on collisions, and particularly to means for laterally diverting a colliding vehicle out of direct line of impact into a "side swiping" action.

While vehicles of modern design and construction, including both automobiles and railway cars may be overturned and caused to roll over and over several times without serious injury to the occupants, those accidents wherein by head-on collision two vehicles are telescoped, or wherein a rapidly traveling vehicle strikes a tree, bridge abutment or other obstruction with great impact in a direct line of travel, injuries to occupants are more often fatal.

The present form of chassis or frame construction is designed to prevent telescoping or head-on crushing impact by inducing a lateral deflection of one or both vehicles out of direct line of impact by camming action incident to the shape of the frame, whereby a head on collision is converted from a telescoping or crushing impact into a "side swipe" action or glancing blow, which while it may still cause damage to the vehicle and may even cause the vehicle to overturn, will prevent the crushing effect usually resulting from such accidents, and is less likely to result in injury to the occupants.

The invention is applicable to automobiles, trucks, busses, railway cars and other traveling vehicles. The protective features herein described may be embodied in one or both ends of the vehicle frame, to protect against rear end impacts as well as against head-on collisions. They may be applied to vehicles of various structural design either as a component part thereof or as an attachment to either the truck frame or body of a vehicle of conventional design.

The object of the invention is to provide safety means for vehicles and for minimizing the effect of head-on collisions, which may not only be economically manufactured, but will be efficient in use, automatic in its action, of simple construction, maximum strength and unlikely to get out of repair.

A further object of the invention is to provide deflecting means at the front or the rear of a vehicle, or at both ends thereof, which in event of collision will tend to guide the vehicle laterally out of straight line impact with an obstruction, and thereby minimize damage to the vehicle and injury to its occupants.

A further object of the invention is to provide a means for automatically diverting a colliding vehicle out of direct impact into a glancing blow which may be incorporated in the vehicle as a component structural feature thereof or may be applied as an attachment to existing vehicles.

A further and important object of the invention is to greatly increase the safety of vehicular travel, and to provide a safety construction having the advantageous structural features and meritorious characteristics herein disclosed.

With the above primary and other incidental objects in view as will more fully appear in the specification, the invention consists of the features of construction, the parts and combinations thereof, and the mode of operation, or their equivalents as hereinafter described and set forth in the claims.

In the drawing, wherein is shown the preferred but not necessarily the only embodiments of the invention, Fig. 1 is a side elevation and Fig. 2 a plan view of an automobile of more or less modernistic design to which the present invention has been applied.

Like parts are indicated by similar characters of reference throughout the several views.

Figure 1:
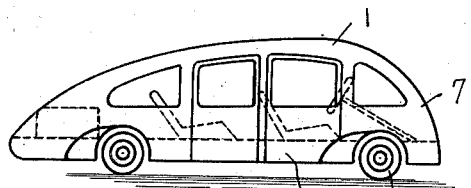
Figure 2:
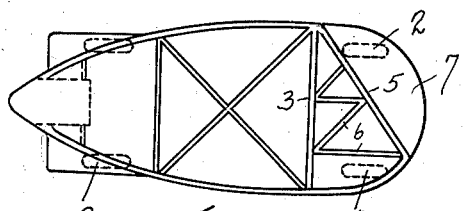

In Figs. 1 and 2 of the drawing, for illustrative purpose, but without any intent to unduly limit or restrict the invention, there is shown a modernistic type of automobile of the streamline style, wherein the driving motor is mounted in the rear of the vehicle. The particular type of vehicle is quite immaterial. Referring to the drawing, 1 is the body of the vehicle, of which 2 are the carrying wheels and 3 indicates the chassis or frame. The front of the chassis 3 is formed with a pilot portion comprising a diagonally disposed frame bar 5 well braced by a system of truss bars 6. The diagonal frame bar 5 is adapted to receive the thrust impact of collision. Due to its laterally and rearwardly inclined form, the pilot affords a camming effect against an obstruction which tends to deflect or guide the vehicle laterally past such obstruction.

Figure 3:
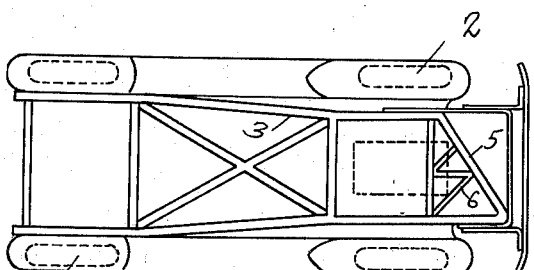
Fig. 3 is a top plan view of a conventional type of motor vehicle chassis in which the invention is embodied.
Figure 4:
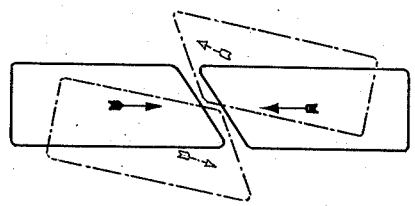
Fig. 4 is a diagrammatic view illustrating the diverting effect of the present invention upon colliding vehicles.

The pilot structure may be so disposed as to project beyond the forward terminus of the vehicle body, as illustrated in Fig. 3, wherein there is shown a conventional style of motor vehicle. As shown in this figure, a conventional style of bumper may also be provided, although the bumper is of such construction as to be relatively weak and, while serving the general purposes of a bumper, will crush or break off under impacts of collision. In the event that the pilot structure is within the confines of the body, as shown in Figs. 1 and 2, the portion 7 of the body is made of relatively light or flimsy construction, which will collapse more easily and thereby expose the pilot structure for sliding contact with the obstruction. The effect of headon collision of two vehicles, each equipped with the present pilot construction, is illustrated diagrammatically in Fig. 4. The camming engagement of the angular pilot structures will counteract the force of the impact by deflecting the vehicles in opposite directions, each being swerved toward the right with relation to its direction of travel and the effect of direct impact will be greatly minimized.

While the pilot extension is shown on only the front of automobile constructions, it is to be understood that such pilot extension may be duplicated at the rear of the vehicle to protect against rear end collision.

Figure 5:
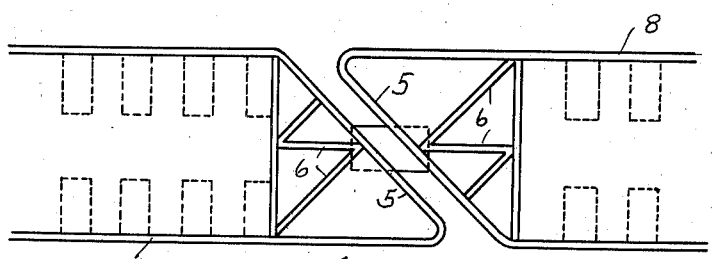
Fig. 5 is a detail plan view of adjacent ends of coupled railway car frames in which the invention is incorporated.
Figure 6:
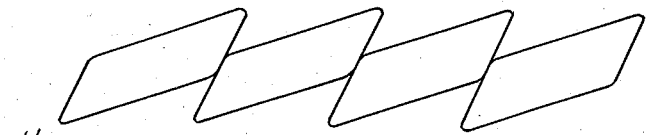
Fig. 6 is a diagrammatic view illustrating the effect of either head-on or rear end collision of a series of railway cars.

In Figs. 5 and 6 are shown more or less diagrammatically intercoupled railway cars, frames 8—8 embodying the invention. In such case, each end of the car frame will be diagonally disposed or shaped. In lieu of the present type of vestibule now provided on railway cars, the tapered pilot portion of each car frame is employed for vestibule purposes and the vestibules thus diagonally overlap each other, and would be entered from the exterior only from the long side, and the passage from one to the other would be in the line of travel across the parallel diagonal impact bars 5 of the respective car frame pilots. In event of either head-on or rear end collision, the diagonal camming effect of the pilot portions of diagonal impact terminals will deflect the cars out of a straight line, as indicated in Fig. 6 and thus obviate the usual telescoping and crushing action, and minimize injury to occupants of the train.

Figure 7:
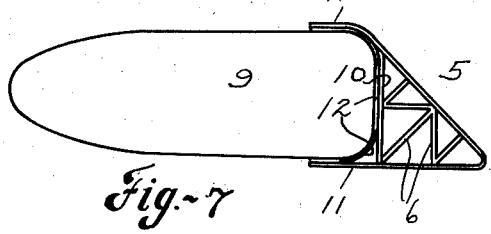
Fig. 7 is a plan view of a vehicle to which the present safety device has been applied as an attachment.

While it is desirable to make the diagonal pilot construction a component part of the vehicle structure, the pilot may be applied as an attachment to existing vehicles, as is shown in Fig. 7. Referring to Fig. 7, 9 indicates the body of a conventional motor vehicle, to the forward portion of the chassis of which is applied the diagonal pilot extension forming the subject matter hereof. This comprises the diagonal impact bar 5 and truss bars 6 as before described. At its rear end the pilot is provided with a transverse tie bar 10 fitted to the vehicle frame and receiving the thrust pressure thereof. The pilot device is provided with rearwardly extending arms 11 at opposite sides, which extend parallel with the vehicle frame to which they are attached. If so desired, a strip of rubber or other resilient material 12 may be interposed between the pilot structure and the vehicle frame, as shown in Fig. 7, to cushion to at least some degree the force of impact.

Figure 8:
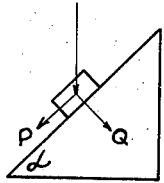
Fig. 8 is a diagram of forces illustrating the principle of the present invention.

The resolution of forces incident to collision impact of the diagonal pilot construction with an obstruction is diagrammatically illustrated in Fig. 8, wherein the force of the impact W is resolved into its components P and Q.

The total of the resolved forces P and Q, are dependent upon the size of the angle alpha. In the equation Q equals W times cosine alpha, and P is equal to W times sine alpha. The undesirable force Q is at its maximum when the angle alpha is zero, in which case cosine of alpha is 1, as is the case when the impact surface is at right angles to the path of travel. The force Q becomes zero when the angle alpha reaches 90 degrees, in which case cosine of alpha is zero, in which event the impact surface would be parallel to the path of travel. This is, of course, merely theoretical, as it is impractical to make the angle alpha 90 degrees. Such an example, however, demonstrates that the larger the angle, the smaller is the impact or disastrous force Q, and the greater is the comparatively harmless force P, which acts to push the vehicles apart to prevent direct head-on collisions.

It is not necessary to completely eliminate the force Q, but it is desirable to keep it within such limits that as little danger as possible results.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. Means for minimizing the effect of a head-on collision of a traveling vehicle, including a horizontally disposed terminal extension on the vehicle extending substantially the full width thereof in a rearwardly inclined relation from one side of the vehicle to beyond the plane of the vehicle wheel at the opposite side thereof, the construction and arrangement being such as to exert a camming action upon an opposing body under influence of impact force by which the path of travel of the vehicle is laterally diverted always in the same direction out of direct line of impact into approximately by-passing relation.

2. The herein described means for minimizing the effect of a head-on collision of a traveling vehicle, including an impact and guiding surface on the vehicle disposed in transverse diagonal relation with the path of travel and extending from one side of the vehicle to the other and exerting camming action upon an opposing body under force of impact by which the vehicle is transposed from direct impact relation into predetermined by-passing relation with the opposing body.

3. Safety means for minimizing the effect of vehicular collisions including a terminal horizontally inclined impact area extending in a substantially flat diagonal plane approximately from one side to the other of the vehicle for impact engagement with an opposing body, by which the path of travel of the vehicle is laterally diverted in a predetermined direction into approximately by-passing relation.

4. The combination with a traveling vehicle of a horizontally inclined deflecting surface at at least one end of the vehicle extending in transverse diagonal relation with the direction of travel from one side to the other of the vehicle, said surface being so located and arranged as to afford a lateral camming action in a predetermined direction under influence of impact force with an opposing body with which said diagonal deflecting surface has impact engagement to thereby guide its vehicle out of direct impact relation therewith.

5. In a motor vehicle, a chassis, a terminal transverse diagonal impact member carried thereby, a body including a collapsible portion overhanging and normally concealing the transversely diagonal impact member, such overhanging portion being yielding under collision impact until the diagonal impact member operatively engages the colliding body, whereupon its camming action therewith serves to laterally divert the course of travel of the vehicle out of direct line of impact.

6. As an article of manufacture, a horizontally inclined fender for a vehicle to be attached in terminal relation thereto and extending in a substantially straight line from one side of the vehicle to the other, so constructed and arranged that by its camming action with a colliding body it will laterally divert the vehicle in a predetermined direction out of direct line of impact therewith.

7. The combination with a vehicle of an inclined bumper carried thereby including rearwardly extending arms engageable with the vehicle chassis and an impact bar supported by the arms and extending in transverse relation from one side to the other of the vehicle and exerting camming action on an encountered obstacle under force of impact to laterally divert the path of travel of the vehicle into by-pass relation with the obstacle.

8. The combination with a vehicle of an inclined bumper carried thereby including a substantially U-shaped rear mounting portion engageable with a vehicle chassis and a transverse impact bar connected with the U-shaped mounting portion and disposed in diagonal relation with the path of travel of the vehicle, extending in a single plane from one side to the other of the vehicle, and exerting camming action under force of impact.

WILLIAM KUNER.